April 28, 1936. J. H. WEBER 2,038,775
DEVICE FOR OPENING SEALED CONTAINERS AND DISPENSING THE CONTENTS THEREOF
Filed July 31, 1935 2 Sheets-Sheet 2
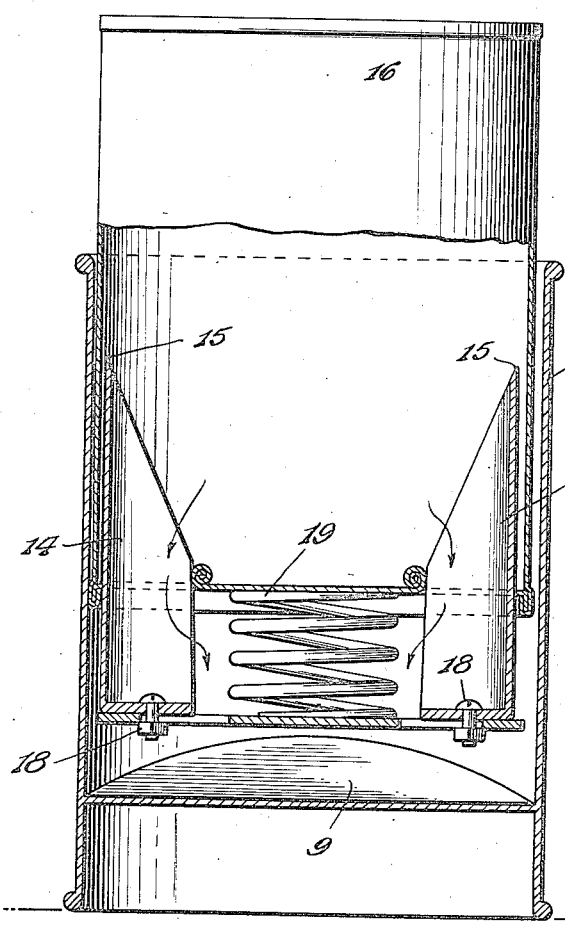
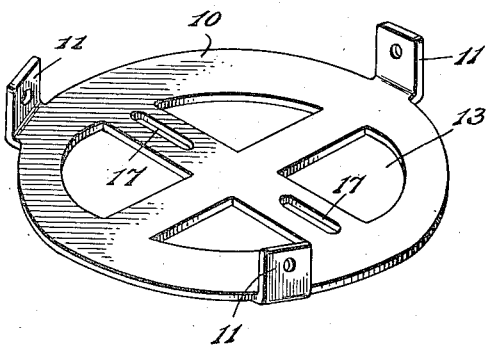
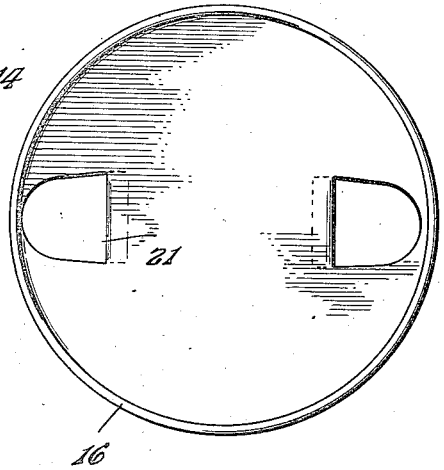
Inventor
John H. Weber.

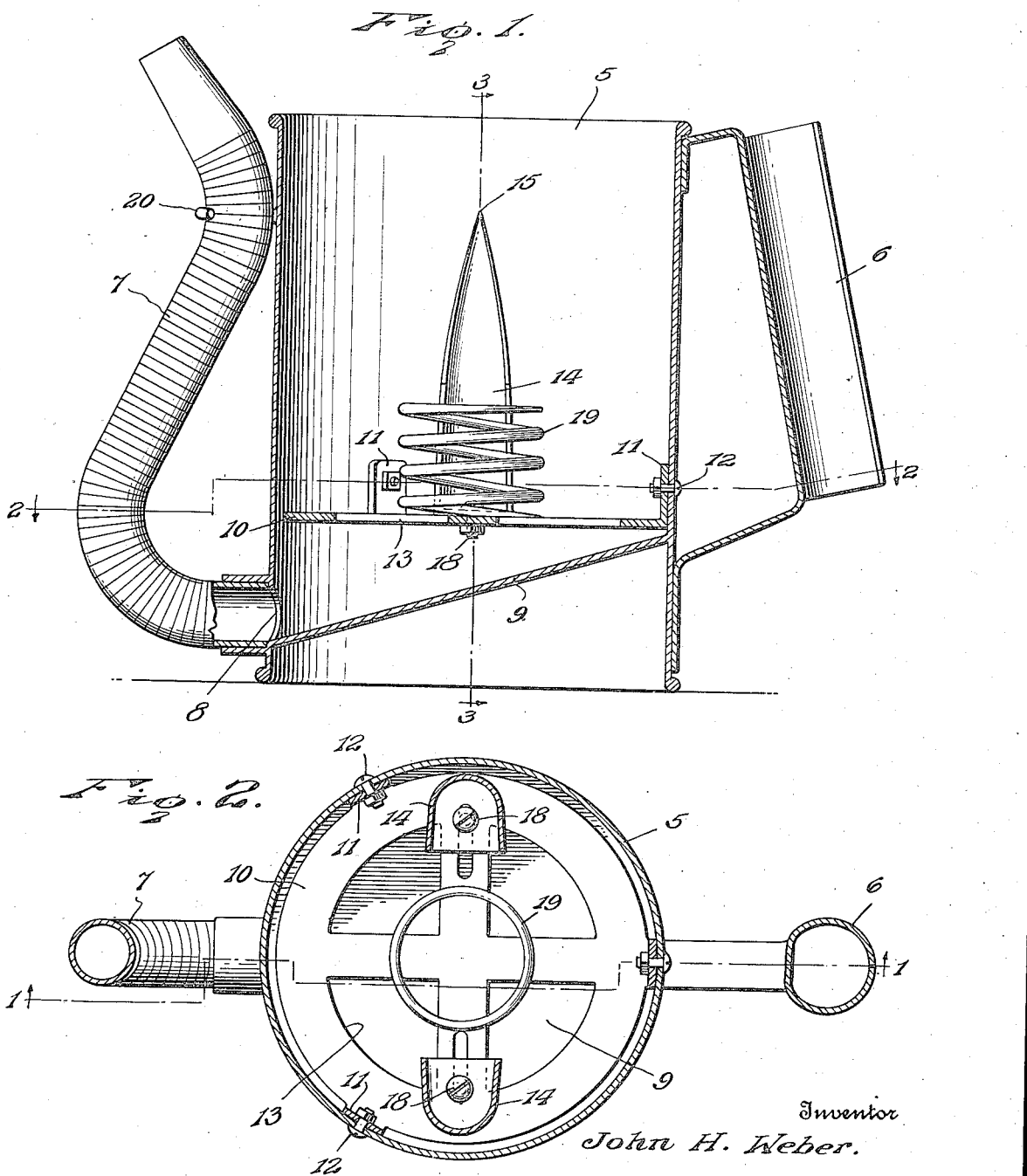

Patented Apr. 28, 1936

2,038,775

UNITED STATES PATENT OFFICE 2,038,775

DEVICE FOR OPENING SEALED CONTAINERS AND DISPENSING THE CONTENTS THEREOF

John H. Weber, Elrosa, Minn.

Application July 31, 1935, Serial No. 34,087

4 Claims. (Cl. 221—23)

This invention relates to devices for opening sealed containers and dispensing the contents thereof.

The object of the invention is to provide a comparatively simple and thoroughly efficient device of this character especially designed for use at automobile filling stations and similar places and by means of which an attendant may readily open a sealed can of lubricating oil and pour the contents thereof into the crank case of a motor car.

A further object is to provide a dispensing funnel or receptacle having upstanding cutting knives or spurs mounted therein and adapted to puncture the bottom of a sealed oil container when the latter is pressed downwardly within the receptacle and thereby to permit the oil to flow through a discharge spout into the crank case.

A further object is to provide means for automatically elevating the oil container within the receptacle after the bottom of the container has been punctured so as to permit the free flow of oil from the container to the delivery spout.

A further object is to provide means for adjusting the cutting knives or spurs laterally within the receptacle to accommodate oil containers of different sizes.

A still further object of the invention is generally to improve this class of devices so as to increase their utility, durability and efficiency.

In the accompanying drawings forming a part of this specification and in which similar numerals of reference indicate corresponding parts in all the figures of the drawings.

Figure 1 is a vertical sectional view of a device for opening sealed containers and dispensing the contents thereof constructed in accordance with the present invention.

Figure 2 is a transverse sectional view taken on the line 2—2 of Figure 1.

Figure 3 is a vertical transverse sectional view taken on the line 3—3 of Figure 1 showing the bottom of the oil container punctured and in elevated position to permit the discharge of the contents thereof.

Figure 4 is a perspective view of the false bottom or disc detached.

Figure 5 is a plan view of an oil container showing the punctures therein.

The device comprises a funnel or receptacle 5 preferably cylindrical in cross section, as shown, and provided at one side thereof with a handle 6 and at the other side with a flexible discharge spout 7, the lower end of which communicates with an opening 8 in the receptacle near the inclined bottom 9 thereof, as shown.

Disposed within the receptacle 5 in spaced relation to the inclined bottom 9 is a false bottom 10 preferably in the form of a disc having peripheral upstanding attaching lugs 11 which bear against the inner wall of the receptacle 5 and are rigidly secured thereto by bolts or similar fastening devices 12. The false bottom or disc 10 is provided with openings 13 to permit the passage of oil therethrough to the discharge spout 7 and mounted on said false bottom or disc are upstanding cutting elements 14 substantially U-shaped in cross section and having their upper ends tapered to form spurs 15 adapted to puncture the bottom of a sealed oil container, indicated at 16. The false bottom or disc 10 is provided with transverse slots 17 and extending through said slots, and through the bottom of the cutting elements 14 are bolts 18 so that by adjusting the cutting elements laterally within the receptacle and tightening the bolts 18, said cutting elements can be used for puncturing sealed oil containers of different sizes. Rigidly secured to the center of the false bottom 10 between the cutting elements 14 is a heavy coiled spring 19, the purpose of which is to automatically elevate the sealed oil container 16 after it has been pressed downwardly within the receptacle 5 to effect the puncturing of the bottom of the container so as to permit the free flow of lubricating oil from the container through the openings 13 in the false bottom to the discharge spout 7. A hook 20 is secured to the receptacle and adapted to support the discharge spout when the device is not in use.

In operation, a sealed can containing lubricating oil is inserted in the top of the receptacle 5 and forced downwardly by exerting a slight pressure thereon with the hand. As the bottom of the oil container comes in contact with the spurs 15 of the cutting elements, said spurs will puncture the bottom of the can and curl or roll the adjacent edges of the can inwardly at the opening formed therein, as indicated at 21 in Figure 5 of the drawings. As soon as the pressure is removed from the top of the oil container, the spring 19 will automatically elevate the container to the position shown in Figure 3 of the drawings, and in which position the oil is free to flow from the container downwardly between the side walls of the cutting elements and thence through the openings 13 in the false bottom to the discharge spout 7 where it may be delivered into the crank case of a car in a well-known manner. After the contents of the oil can or container are discharged, said container may be removed through the top of the receptacle and thrown away or otherwise discarded, thus leaving the device in condition to receive another sealed oil container when it is desired to dispense more oil.

It will here be noted that the oil container is forced downwardly against the tension of the coiled spring 19 so that the bottom of the can never comes in contact with the disc 10 and that the resiliency of the spring will force the container 16 upwardly to the position shown in Figure 3 of the drawings and in which position the upper end of the oil container projects above the upper end of the receptacle 5 so as to be in convenient position to be removed from the receptacle after all of the oil has been discharged therefrom. It will also be noted that the cutting elements or blades are adjustable laterally within the receptacle 5 to accommodate oil containers of different sizes and also to facilitate removing and resharpening the cutting elements when desired or necessary.

It will, of course, be understood that the devices may be made in different sizes and shapes to accommodate any standard size sealed oil containers.

Having thus described the invention, what is claimed as new is:

1. A device of the class described comprising a receptacle adapted to receive a sealed container and provided with a discharge spout, a false bottom disposed within the receptacle, cutting elements mounted for lateral adjustment on the false bottom and adapted to puncture the bottom of the container when pressure is applied to the top thereof, and a coiled spring resting on the false bottom between the cutting elements for automatically elevating the container within the receptacle when the pressure is removed from the top thereof.

2. A device of the class described comprising a receptacle adapted to receive a sealed container and provided with an inclined bottom and a discharge spout, an auxiliary bottom spaced from the inclined bottom and provided with spaced transverse slots, cutting elements mounted on the false bottom at said slots and adapted to puncture the bottom of the container when pressure is applied to the top of the container, bolts extending through the cutting elements and said slots for holding the cutting elements in an adjusted position, and a coiled spring resting on the false bottom for automatically elevating the container within the receptacle when pressure is removed from the top thereof.

3. A device of the class described comprising a receptacle adapted to receive a sealed container and provided with an inclined bottom and discharge spout, an auxiliary bottom disposed within the receptacle and provided with circumferential upstanding lugs rigidly secured to the inner wall of the receptacle, said auxiliary bottom being provided with openings, cutting elements mounted for lateral adjustment on the auxiliary bottom and provided with terminal spurs adapted to puncture the container when a downward pressure is exerted on the top of the container, and a coiled spring mounted on the auxiliary bottom at the openings therein and adapted to engage the bottom of the container for forcing the container upwardly within the receptacle when pressure on the upper end of the container is removed.

4. A device of the class described comprising a receptacle adapted to receive a sealed container and provided with an inclined bottom and a discharge spout, an auxiliary bottom spaced from the inclined bottom and having openings formed therein, said auxiliary bottom being provided with spaced transverse slots and having upstanding lugs rigidly secured to the inner wall of the receptacle, arcuate cutting elements mounted on the auxiliary bottom and having their upper ends tapered to form terminal spurs adapted to puncture the bottom of the container when pressure is applied to the upper portion thereof, the lower ends of said cutting elements being closed and each provided with a perforation, bolts extending through the slots in the auxiliary bottom and perforations in the closed ends of the cutting elements and a coiled spring resting on the auxiliary bottom between the cutting elements for automatically elevating the container within the receptacle when pressure on the upper end of the container is removed.

JOHN H. WEBER.